(12) United States Patent
Vu et al.

(10) Patent No.: US 12,044,774 B2
(45) Date of Patent: Jul. 23, 2024

(54) DUAL PURPOSE MILLIMETER WAVE FREQUENCY BAND TRANSMITTER

(71) Applicant: Advanced Micro Devices, Inc., Santa Clara, CA (US)

(72) Inventors: Ngoc Vinh Vu, Cupertino, CA (US); Neil Patrick Kelly, Austin, TX (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 0 days.

(21) Appl. No.: 18/048,689

(22) Filed: Oct. 21, 2022

(65) Prior Publication Data

US 2023/0061698 A1    Mar. 2, 2023

Related U.S. Application Data

(63) Continuation of application No. 17/125,685, filed on Dec. 17, 2020, now Pat. No. 11,480,672, which is a continuation of application No. 15/721,457, filed on Sep. 29, 2017, now Pat. No. 10,871,559.

(51) Int. Cl.
| | |
|---|---|
| G01S 13/89 | (2006.01) |
| G01S 7/00 | (2006.01) |
| G01S 7/04 | (2006.01) |
| G02B 27/01 | (2006.01) |
| H04N 5/38 | (2006.01) |
| H04N 5/44 | (2011.01) |
| H04N 7/20 | (2006.01) |

(52) U.S. Cl.
CPC .............. *G01S 13/89* (2013.01); *G01S 7/006* (2013.01); *G01S 7/04* (2013.01); *H04N 5/38* (2013.01); *H04N 7/20* (2013.01); *G02B 27/017* (2013.01); *G02B 2027/0178* (2013.01); *H04N 5/44* (2013.01)

(58) Field of Classification Search
CPC  G01S 13/89; G01S 7/006; G01S 7/04; H04N 5/38; H04N 7/20; H04N 5/44; G02B 2027/017; G02B 2027/0178
See application file for complete search history.

(56) References Cited

U.S. PATENT DOCUMENTS

| | | |
|---|---|---|
| 5,818,543 A | 10/1998 | Lee |
| 5,860,056 A | 1/1999 | Pond |
| 6,414,960 B1 | 7/2002 | Kuhn et al. |
| 7,479,981 B2 | 1/2009 | Tierney et al. |
| 7,715,634 B2 | 5/2010 | Lei et al. |

(Continued)

*Primary Examiner* — Marc Anthony Armand
(74) *Attorney, Agent, or Firm* — Kowert, Hood, Munyon, Rankin & Goetzel, P.C.; Rory D. Rankin (57) ABSTRACT

Systems, apparatuses, and methods for implementing a dual-purpose millimeter-wave frequency band transmitter are disclosed. A system includes a dual-purpose transmitter sending a video stream over a wireless link to a receiver. In some embodiments, the video stream is generated as part of an augmented reality (AR) or virtual reality (VR) application. The transmitter operates in a first mode to scan and map an environment of the transmitter and receiver. The transmitter generates radio frequency (RF) signals in a first frequency range while operating in the first mode. Additionally, the transmitter operates in a second mode to send video data to the receiver, and the transmitter generates RF signals in the first frequency range while operating in the second mode.

17 Claims, 8 Drawing Sheets

(56) References Cited

U.S. PATENT DOCUMENTS

| | | |
|---|---|---|
| 7,881,258 B2 | 2/2011 | Gilbert et al. |
| 8,365,238 B2 | 1/2013 | Reznic et al. |
| 8,422,961 B2 | 4/2013 | Kafle |
| 9,786,985 B2 | 10/2017 | Kim et al. |
| 10,312,980 B2 | 6/2019 | Maamari et al. |
| 10,871,559 B2 | 12/2020 | Vu et al. |
| 11,480,672 B2 | 10/2022 | Vu et al. |
| 2004/0204103 A1 | 10/2004 | Rouphael |
| 2005/0185097 A1 | 8/2005 | Takatori et al. |
| 2006/0209890 A1 | 9/2006 | MacMullan et al. |
| 2006/0209892 A1 | 9/2006 | MacMullan et al. |
| 2006/0212911 A1 | 9/2006 | MacMullan et al. |
| 2007/0223380 A1 | 9/2007 | Gilbert et al. |
| 2008/0088635 A1 | 4/2008 | Callway et al. |
| 2010/0009635 A1 | 1/2010 | Qin et al. |
| 2010/0214169 A1 | 8/2010 | Kafle |
| 2011/0058104 A1 | 3/2011 | Arai |
| 2011/0070928 A1 | 3/2011 | Hsu et al. |
| 2011/0151790 A1 | 6/2011 | Khandekar et al. |
| 2012/0327115 A1 | 12/2012 | Chhetri et al. |
| 2013/0115887 A1 | 5/2013 | Kwon et al. |
| 2013/0242117 A1 | 9/2013 | Luo et al. |
| 2014/0010319 A1 | 1/2014 | Baik et al. |
| 2014/0126620 A1 | 5/2014 | Maltsev et al. |
| 2014/0266900 A1 | 9/2014 | Kasher |
| 2014/0368667 A1 | 12/2014 | Peterson et al. |
| 2015/0289147 A1 | 10/2015 | Lou et al. |
| 2016/0105229 A1 | 4/2016 | Trainin et al. |
| 2016/0149633 A1 | 5/2016 | Sanderovich et al. |
| 2017/0134076 A1 | 5/2017 | Maamari et al. |
| 2017/0156067 A1 | 6/2017 | Huang |
| 2017/0207839 A1 | 7/2017 | Eitan et al. |
| 2017/0222704 A1 | 8/2017 | Eitan et al. |
| 2017/0251484 A1 | 8/2017 | Negus et al. |
| 2017/0264350 A1 | 9/2017 | Sanderovich et al. |
| 2018/0062719 A1 | 3/2018 | Verma et al. |
| 2018/0067204 A1* | 3/2018 | Frizzell ............... G01S 13/887 |
| 2018/0074188 A1 | 3/2018 | Polo et al. |
| 2018/0095542 A1* | 4/2018 | Mallinson ............ G06T 19/006 |
| 2018/0198506 A1 | 7/2018 | Sanderovich et al. |
| 2018/0205423 A1 | 7/2018 | Sanderovich et al. |
| 2018/0227027 A1 | 8/2018 | Trainin et al. |
| 2018/0234860 A1 | 8/2018 | Kasher et al. |
| 2018/0248603 A1 | 8/2018 | Kasher et al. |
| 2019/0036572 A1 | 1/2019 | Kasher et al. |
| 2019/0044596 A1 | 2/2019 | Bolotin et al. |
| 2019/0068473 A1 | 2/2019 | Vu |
| 2019/0104276 A1 | 4/2019 | Vu et al. |
| 2019/0158156 A1 | 5/2019 | Da Silva et al. |
| 2019/0199467 A1 | 6/2019 | Vu |

\* cited by examiner

DUAL PURPOSE MILLIMETER WAVE FREQUENCY BAND TRANSMITTER

CROSS REFERENCE TO RELATED APPLICATIONS

This application is a continuation of U.S. patent application Ser. No. 17/125,685, now U.S. Pat. No. 11,480,672, entitled "Dual Purpose Millimeter Wave Frequency Band Transmitter", filed Dec. 17, 2020, which is a continuation of U.S. patent application Ser. No. 15/721,457, now U.S. Pat. No. 10,871,559, entitled "Dual Purpose Millimeter Wave Frequency Band Transmitter", filed Sep. 29, 2017, the entirety of which is incorporated herein by reference.

BACKGROUND

Description of the Related Art

Wireless signals generated at frequencies between 30 and 300 gigahertz (GHz) on the radio spectrum are used for many different types of applications. When transmitting radio frequency (RF) signals at frequencies between 30 and 300 GHz, the wavelength ($\lambda$) is in the 1-mm to 10-mm range. In some applications, wireless devices communicate in accordance with the Institute of Electrical and Electronics Engineers (IEEE) 802.11ad standard (i.e., WiGig) over the unlicensed 60 GHz frequency band.

A wireless communication link can be used to send a video stream from a computer (or other device) to a virtual reality (VR) headset (or head mounted display (HMD)). Transmitting the VR video stream wirelessly eliminates the need for a cable connection between the computer and the user wearing the HMD, thus allowing for unrestricted movement by the user. A traditional cable connection between a computer and HMD typically includes one or more data cables and one or more power cables. Allowing the user to move around without a cable tether and without having to be cognizant of avoiding the cable creates a more immersive VR system. Sending the VR video stream wirelessly also allows the VR system to be utilized in a wider range of applications than previously possible.

BRIEF DESCRIPTION OF THE DRAWINGS

The advantages of the methods and mechanisms described herein may be better understood by referring to the following description in conjunction with the accompanying drawings, in which.

DETAILED DESCRIPTION OF EMBODIMENTS

In the following description, numerous specific details are set forth to provide a thorough understanding of the methods and mechanisms presented herein. However, one having ordinary skill in the art should recognize that the various embodiments may be practiced without these specific details. In some instances, well-known structures, components, signals, computer program instructions, and techniques have not been shown in detail to avoid obscuring the approaches described herein. It will be appreciated that for simplicity and clarity of illustration, elements shown in the figures have not necessarily been drawn to scale. For example, the dimensions of some of the elements may be exaggerated relative to other elements.

Various systems, apparatuses, methods, and computer-readable mediums for operating a multi-mode wireless transmitter in a millimeter-wave frequency band are disclosed herein. In one embodiment, a wireless communication system includes a dual-mode transmitter and a receiver communicating over a wireless link. The transmitter is configured to operate in a first mode to map an environment of the transmitter and the receiver. The transmitter generates radio frequency (RF) signals in a first frequency range while operating in the first mode. In one embodiment, the first frequency range is in the unlicensed 60 GHz band. The transmitter is also configured to operate in a second mode to send video data to the receiver. The transmitter generates RF signals in the first frequency range while operating in the second mode. In one embodiment, the transmitter sends virtual reality (VR) video data to the receiver while operating in the second mode. In another embodiment, the transmitter sends augmented reality (AR) video data to the receiver while operating in the second mode. In other embodiments, the transmitter can send other types of data to the receiver while operating in the second mode. Additionally, in further embodiments, the transmitter can operate in three or more different modes (e.g., beamforming training mode, rendering mode).

In one embodiment, the transmitter is configured to determine an optimal antenna sector and an optimal beam at least in part from a map of the environment generated while operating in the first mode. For example, the transmitter identifies one or more obstacles from the map of the environment and then selects an optimal antenna sector and an optimal beam which avoids the identified obstacle(s). The transmitter is configured to send video data to the receiver via the optimal antenna sector and optimal beam while operating in the second mode.

In one embodiment, the transmitter is configured to render at least a portion of a first video frame based on a map of the environment generated while operating in the first mode. For example, the transmitter can generate one or more virtual objects and place the one or more virtual objects in locations associated with one or more physical objects detected in the environment. Then, while operating in the second mode, the transmitter sends the first video frame to the receiver. Alternatively, a graphics card or other processing unit coupled to the transmitter is configured to receive the map generated by the transmitter, and then the graphics card or other processing unit is configured to utilize information from the map when rendering video data for the VR or AR application. The graphics card or other processing unit conveys the rendered video data to the transmitter, and then the transmitter encodes the video data and wirelessly transmits the encoded video data to the receiver. The receiver can then decode and display the received video data.

Figure 1:
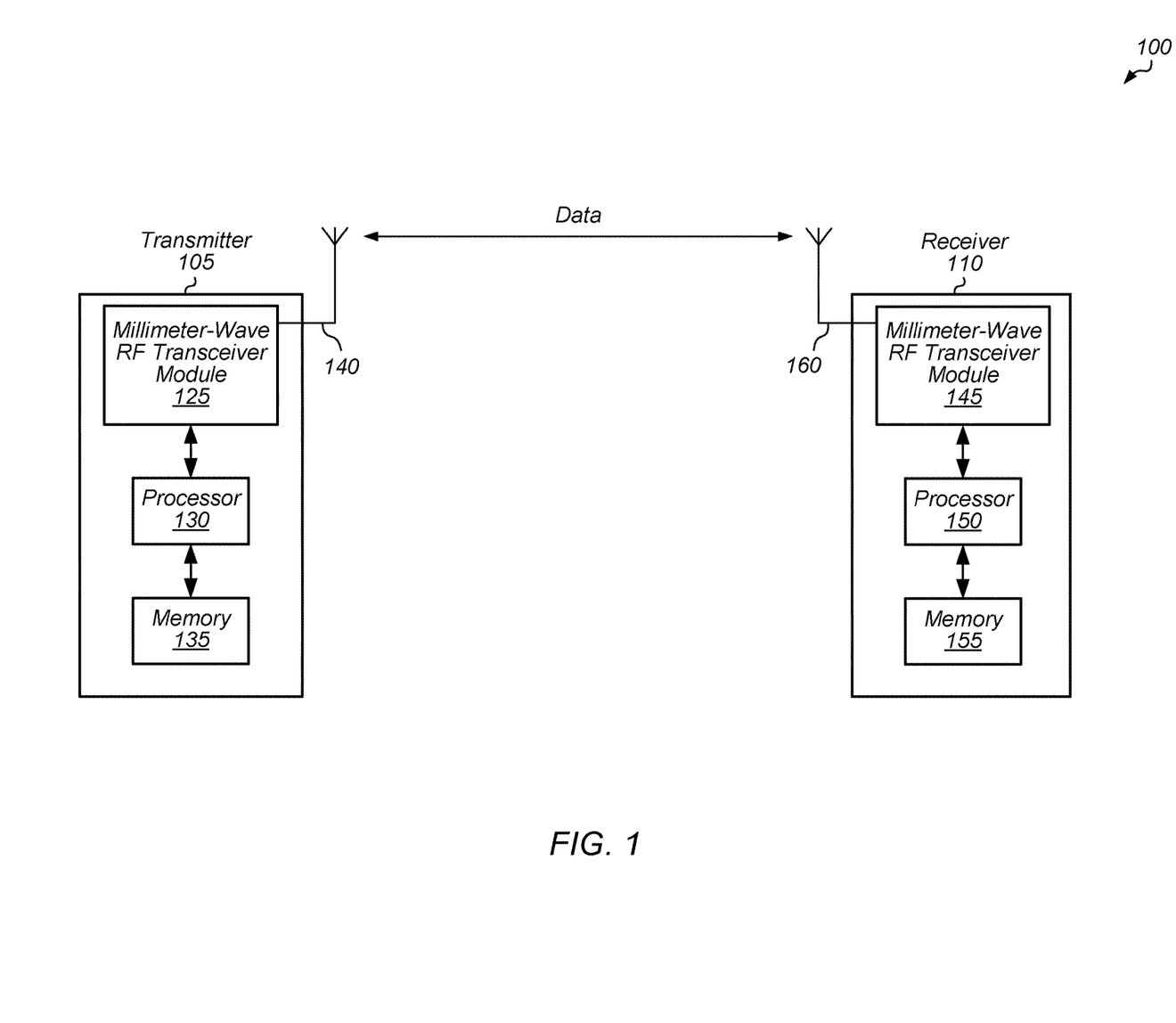
FIG. 1 is a block diagram of one embodiment of a system.

Referring now to FIG. 1, a block diagram of one embodiment of a system 100 is shown. System 100 includes at least a first communications device (e.g., transmitter 105) and a second communications device (e.g., receiver 110) operable to communicate with each other wirelessly. It is noted that transmitter 105 and receiver 110 can also be referred to as transceivers. In one embodiment, transmitter 105 and receiver 110 communicate wirelessly over the unlicensed 60 Gigahertz (GHz) frequency band. For example, transmitter 105 and receiver 110 can communicate in accordance with the Institute of Electrical and Electronics Engineers (IEEE) 802.11ad standard (i.e., WiGig). In other embodiments, transmitter 105 and receiver 110 can communicate wirelessly over other frequency bands and/or by complying with other wireless communication standards.

Wireless communication devices that operate within extremely high frequency (EHF) bands, such as the 60 GHz frequency band, are able to transmit and receive signals using relatively small antennas. However, such signals are subject to high atmospheric attenuation when compared to transmissions over lower frequency bands. In order to reduce the impact of such attenuation and boost communication range, EHF devices typically incorporate beamforming technology. For example, the IEEE 802.11ad specification details a beamforming training procedure, also referred to as sector-level sweep (SLS), during which a wireless station tests and negotiates the best transmit and/or receive antenna combinations with a remote station. In various embodiments, transmitter 105 and receiver 110 are configured to perform periodic beamforming training procedures to determine the optimal transmit and receive antenna combinations for wireless data transmission.

In one embodiment, transmitter 105 and receiver 110 have directional transmission and reception capabilities, and the exchange of communications over the link utilizes directional transmission and reception. Each directional transmission is a transmission that is beamformed so as to be directed towards a selected transmit sector of antenna 140. Similarly, directional reception is performed using antenna settings optimized for receiving incoming transmissions from a selected receive sector of antenna 160. The link quality can vary depending on the transmit sectors selected for transmissions and the receive sectors selected for receptions. The transmit sectors and receive sectors which are selected are determined by system 100 performing a beamforming training procedure. The transmit sectors and receive sectors can also be selected based on a scan of the environment performed by transmitter 105.

Transmitter 105 and receiver 110 are representative of any type of communication devices and/or computing devices. For example, in various embodiments, transmitter 105 and/or receiver 110 can be a mobile phone, tablet, computer, server, head-mounted display (HMD), television, another type of display, router, or other types of computing or communication devices. In one embodiment, system 100 executes a virtual reality (VR) application for wirelessly transmitting frames of a rendered virtual environment from transmitter 105 to receiver 110. In other embodiments, other types of applications (e.g., augmented reality (AR) applications) can be implemented by system 100 that take advantage of the methods and mechanisms described herein.

In one embodiment, transmitter 105 includes at least millimeter-wave radio frequency (RF) transceiver module 125, processor 130, memory 135, and antenna 140. The circuitry of transmitter 105 can also include one or more pulse generators, analog to digital converters (ADCs), filters, etc. Millimeter-wave RF transceiver module 125 is configured to transmit and receive RF signals. In one embodiment, module 125 is operable to wirelessly transmit and receive signals over one or more channels in the 60 GHz band. Module 125 converts baseband signals into RF signals for wireless transmission, and module 125 converts RF signals into baseband signals for the extraction of data by transmitter 105. It is noted that module 125 is shown as a single unit for illustrative purposes. It should be understood that module 125 can be implemented with any number of different units (e.g., chips) or components depending on the embodiment. Similarly, processor 130 and memory 135 are representative of any number and type of processors and memory devices, respectively, that can be implemented as part of transmitter 105.

Transmitter 105 also includes antenna 140 for transmitting and receiving RF signals. In various embodiments, millimeter-wave RF transceiver module 125 configures antenna 140 for the specific mode being utilized. Antenna 140 represents one or more antennas, such as a phased array, a single element antenna, a set of switched beam antennas, etc., that can be configured to change the directionality of the transmission and reception of radio signals. As an example, antenna 140 includes one or more antenna arrays, where the amplitude or phase for each antenna within an antenna array can be configured independently of other antennas within the array. Although antenna 140 is shown as being external to transmitter 105, it should be understood that antenna 140 can be included internally within transmitter 105 in various embodiments. In some cases, a receive antenna and a transmit antenna are combined into a single antenna 140. In other cases, antenna 140 includes separate receive and transmit antennas.

Additionally, it should be understood that transmitter 105 can also include any number of other components which are not shown to avoid obscuring the figure. Similar to transmitter 105, the components implemented within receiver 110 include at least millimeter-wave RF transceiver module 145, processor 150, memory 155, and antenna 160, which are similar to the components described above for transmitter 105. It is noted that receiver 110 can also include or be coupled to other components (e.g., a display).

In one embodiment, transmitter 105 is configured to operate in a first mode to map the environment (e.g., a room) which contains transmitter 105 and receiver 110. When operating in the first mode, transmitter 105 generates radiation at frequencies between 30 GHz to 300 GHz which corresponds to millimeter wavelengths (e.g., 1 cm to 1 mm). The millimeter wavelengths generated at these frequencies allow narrow beams to be created. Objects in the environment can be accurately located due to the narrow beams, allowing high resolution maps and/or images of the environment to be generated. It is noted that while the embodiments herein may be described in terms of 30-300 GHz frequencies, and in some cases 60 GHz in particular, with corresponding wavelengths, the methods and mechanisms described herein are not limited to such frequencies or wavelengths. Embodiments using higher and/or lower frequencies with corresponding shorter and/or longer wavelengths are possible and are contemplated.

In one embodiment, module 125 maps the environment by transmitting electromagnetic waves into the environment and receiving reflections. Module 125 analyzes the reflections to determine the angle of arrival and the distance of the objects which caused the reflections. This information can also be refined by information obtained during a beamforming scan. In one embodiment, the mapping information is used to support an augmented reality (AR) application and mapping process. In one embodiment, the mapping information can be used to draw new objects in the current environment. For example, by mapping the environment, module 125 can determine there is an object (e.g., a wall) a certain distance in front of the player. The game engine can then treat the wall as a projector screen to overlay various types of visual information. For example, a virtual object (e.g., virtual car, virtual ball, virtual projectile) could be rendered that hits the wall from behind. In another embodiment, module 125 can track a moving object in virtual reality (VR) applications. Other features that enhance an AR or VR application based on the mapping information generated by module 125 are possible and are contemplated.

In one embodiment, module 125 generates a plurality of pulses which are emitted in a horizontal and vertical scan of the environment. Then, module 125 receives return signals in response to the emitted pulses. Module 125 processes the return signals and creates data samples which are conveyed to processor 130. Processor 130 is configured to process the data samples to generate information about spatial locations of various physical objects in the environment. Processor 130 is configured to generate a map of the environment from the spatial location information of the various physical objects. Processor 130 is also configured to generate a virtual representation of the environment and render video frames incorporating at least a portion of the virtual representation of the environment. Alternatively, transmitter 105 is coupled to a processor or other device which generates the virtual representation of the environment and/or renders video frames incorporating information from the virtual representation of the environment.

A map of the environment is generated as a function of the position and orientation of various physical objects which are detected within the environment. In one embodiment, the map is generated to indicate which physical objects can be viewed from the point of view of the receiver 110. In one embodiment, the receiver 110 represents a user wearing a head-mounted display (HMD). In one embodiment, a three-dimensional (3D) model of the environment is generated based on which portions of the environment can be viewed by the user wearing the HMD based on the direction the user's head is facing. The 3D model of the environment can then be utilized to render video data. When operating in a second mode (i.e., wireless transmission mode), transmitter 105 is configured to convey the rendered video data to receiver 110. Receiver 110 will then display the received video data.

The video data can be rendered by transmitter 105 or by a computing or processing device coupled to transmitter 105. Additionally, in one embodiment, during rendering, one or more virtual objects are generated and placed in locations associated with one or more physical objects in the 3D model. In one embodiment, shadow mapping techniques are utilized to render video data. For example, in this embodiment, a shadow map is projected onto the environment from the position of one or more light sources. If a region cannot receive light from the light source, then the region is rendered with deeper color.

Figure 2:
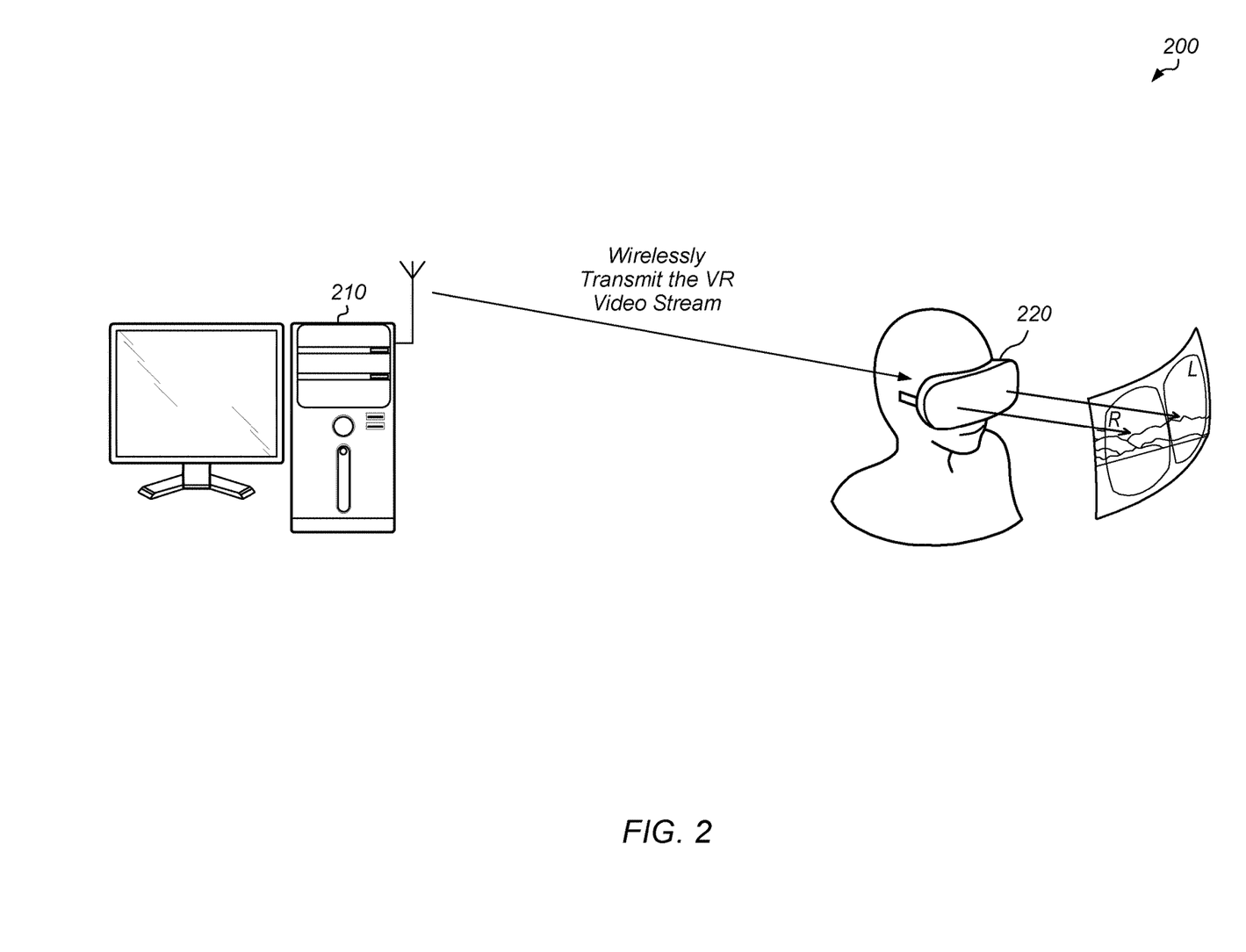
FIG. 2 is a block diagram of one embodiment of a wireless virtual reality (VR) system.

Turning now to FIG. 2, a block diagram of one embodiment of a wireless virtual reality (VR) system 200 is shown. System 200 includes at least computer 210 and head-mounted display (HMD) 220. Computer 210 is representative of any type of computing device which includes one or more processors, memory devices, input/output (I/O) devices, RF components, antennas, and other components indicative of a personal computer or other computing device. In other embodiments, other computing devices, besides a personal computer, can be utilized to send video data wirelessly to head-mounted display (HMD) 220. For example, computer 210 can be a gaming console, smart phone, set top box, television set, video streaming device, wearable device, a component of a theme park amusement ride, or otherwise.

Computer 210 and HMD 220 each include circuitry and/or components to communicate wirelessly. It is noted that while computer 210 is shown as having an external antenna, this is shown merely to illustrate that the video data is being sent wirelessly. It should be understood that computer 210 can have an antenna which is internal to the external case of computer 210. Additionally, while computer 210 can be powered using a wired power connection, HMD 220 is typically battery powered. Alternatively, computer 210 can be a laptop computer powered by a battery.

In one embodiment, computer 210 includes circuitry configured to dynamically render a representation of a VR environment to be presented to a user wearing HMD 220. For example, in one embodiment, computer 210 includes one or more graphics processing units (GPUs) to render a VR environment. In other embodiments, computer 210 can include other types of processors, including a central processing unit (CPU), application specific integrated circuit (ASIC), field programmable gate array (FPGA), digital signal processor (DSP), or other processor types. HMD 220 includes circuitry to receive and decode a compressed bit stream sent by computer 210 to generate frames of the rendered VR environment. HMD 220 then drives the generated frames to the display integrated within HMD 220.

In one embodiment, computer 210 is configured to transmit millimeter wavelength electromagnetic signals in a horizontal and vertical sweep across the environment (e.g., a room) and then received the reflected signals from the sweep. Computer 210 is configured to generate a map of the environment from an analysis of the reflected signals. Then, as one or more objects move within the environment, including movement by the user wearing HMD 220, computer 210 is configured to amend the map with updated position and/or orientation information. Computer 210 is configured to perform RF signal sweeps to map the environment on regular and/or programmable intervals. The interval for performing the RF signal sweep across the environment can vary according to the embodiment.

A video stream is sent from computer 210 over the wireless data link to HMD 220, and HMD 220 projects video frames onto the display of HMD 220. In one embodiment, HMD 220 provides an immersive VR or AR experience for the user to view the immediate environment. For example, HMD 220 displays one or more virtual objects (e.g., graphics, images, 3D shapes, text) which are added to the video frames being generated for and displayed on HMD 220. In one embodiment, one or more virtual objects are added to the video stream by computer 210. In another embodiment, one or more virtual objects are added to the video frames by HMD 220 after receiving the video stream sent by computer 210. The one or more virtual objects can be added proximate to one or more physical objects detected in the environment and/or proximate to the user wearing HMD 220.

In one embodiment, mapping information (e.g., one or more coordinate maps) from an environment is generated by the dual-mode millimeter wave RF transceiver module and processing circuitry of computer 210 operating in a mapping mode. In another embodiment, mapping information is generated by the millimeter wave RF transceiver module and processing circuitry of HMD 220. In a further embodiment, mapping information is generated from both the dual-mode millimeter wave RF transceiver module and processing circuitry in computer 210 and the millimeter wave RF transceiver module and processing circuitry of HMD 220. In this embodiment, the combination of mapping information obtained from both computer 210 and HMD 220 can provide a more detailed 3D-representation of the environment.

In a still further embodiment, one or more transceivers in addition to computer 210 and HMD 220 can map the environment with millimeter-wave RF signals, and these multiple maps are then utilized to generate a 3D-representation of the environment. This 3-D representation is used to render the video frames being displayed on HMD 220. For example, one or more objects detected within the environment allow computer 210 to render the one or more objects within a video frame sent wirelessly to and displayed by HMD 220. In one embodiment, computer 210 renders one or more virtual objects within a video frame which are rendered based on one or more physical objects detected within the environment. When presented in this manner, the inclusion of virtual objects within the environment can create a VR or AR experience and enable user interactions with the virtual objects.

For example, in an AR application, a first virtual object (e.g., a virtual person) can be rendered sitting in a first physical object (e.g., a chair) within a video frame sent to and displayed by HMD 220. In this example, the user will actually see the real chair in the room, and the user will also see the first virtual object projected on the real chair. In some scenarios, the first virtual object can then be rendered standing up and walking around the room in subsequent video frames. Additionally, a second virtual object (e.g., a window) can be rendered on a second physical object (e.g., a wall) within the video frame. Other types of virtual objects rendered in relation to other types of physical objects within various video frames are possible and are contemplated.

Computer 210 is configured to send video data via the wireless data link to HMD 220. Processing circuitry inside HMD 220 is configured to use the received video data to output video images on the display of HMD 220. In one embodiment, the video data sent via the wireless data link includes 3D depth data, 3D distance data, and orientation data with respect to HMD 220 for various objects detected in the environment during a mapping mode implemented by computer 210. The video data is generated based on spatial data of various objects detected in the environment during the mapping mode.

Different types of HMDs 220 can be utilized depending on the embodiment. In one embodiment, the user is not able to view the scene behind the display of HMD 220. In this embodiment, HMD 220 blocks the user's view of the room while providing virtual objects in the display which are shown to represent the physical objects in the room. For example, the boundaries (e.g., walls, floor, stairs, furniture) of the room can be shown as virtual walls, floors, stairs, furniture, or other objects to provide indications of how far the user can move without bumping into actual physical objects. Alternatively, the virtual objects can be floating in space without connection to any of the actual physical objects which were detected in the room. As the user moves relative to any virtual objects, the size, orientation, and perspective of the virtual objects can change to accurately reflect the user movement. In another embodiment, HMD 220 is semitransparent allowing the user to view the scene behind the display with projected images appearing superimposed on the background scene. For example, in one embodiment, HMD 220 can be a pair of glasses which project virtual objects onto the lens of the glasses while still allowing the user to view the scene behind the glasses.

Figure 3:
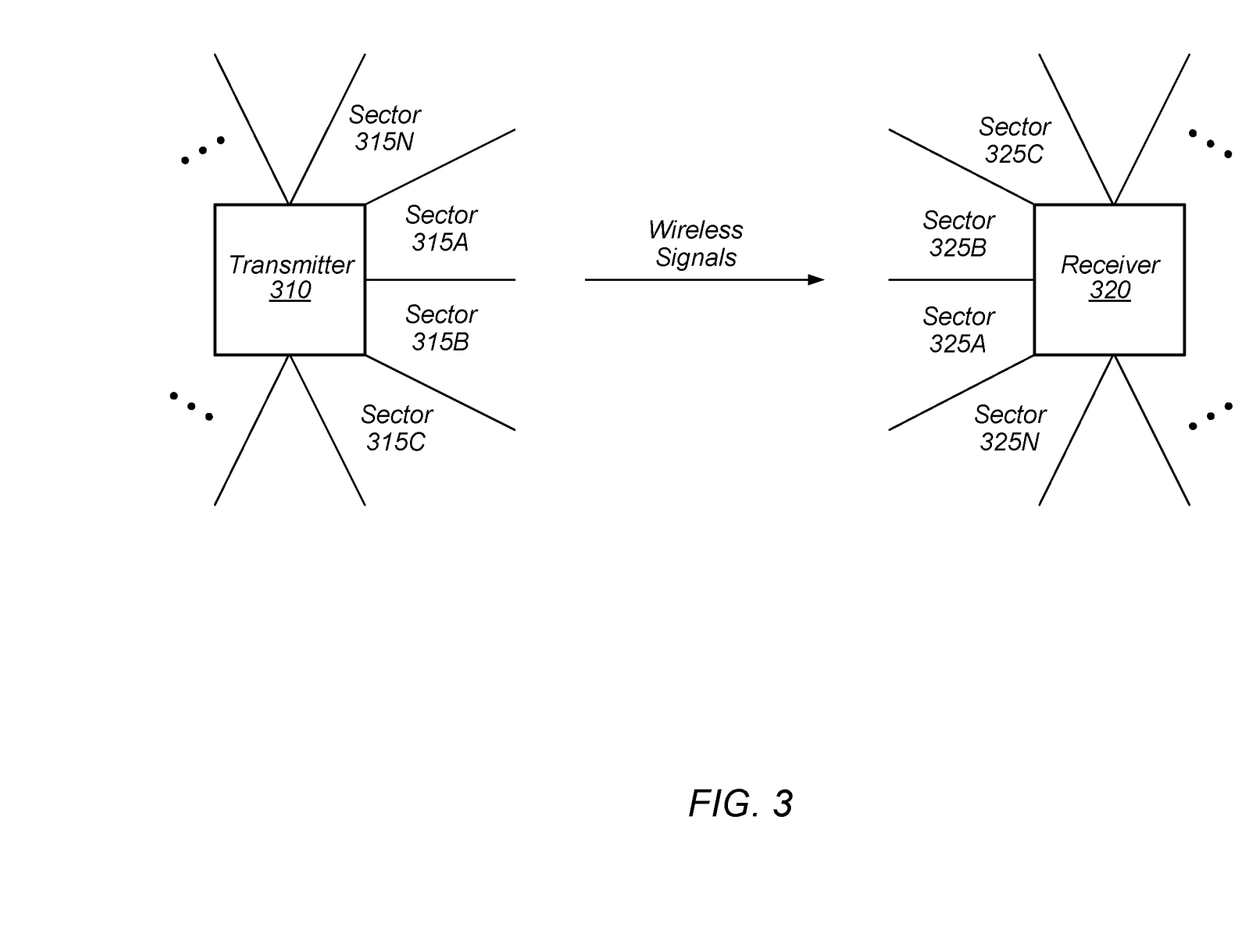
FIG. 3 is a diagram of one embodiment of transmit and receive beamforming sectors.

Referring now to FIG. 3, a diagram depicting transmit and receive beamforming sectors is shown. In one embodiment, transmitter 310 is configured to perform each of its directional transmissions towards a respective transmit sector selected from among a plurality of transmit sectors 315A-N. Transmit sectors 315A-N are representative of any number of transmit sectors, with the number varying from embodiment to embodiment. Receiver 320 is configured to perform each of its directional receptions from a respective receive sector selected from among a plurality of receive sectors 325A-N, which are representative of any number of receive sectors.

When communicating with receiver 320, transceiver 310 directionally transmits RF signals toward a selected one of transmit sectors 315A-N. If transceiver 310 transmits signals toward transmit sectors in a direction away from receiver 320, the energy levels of signals received by receiver 320 will be low, preventing receiver 320 from successfully receiving the signals. Otherwise, if transmitter 310 transmits signals to a transmit sector oriented toward receiver 320, signals will arrive at receiver 320 with high levels of energy. For example, if receiver 320 is monitoring receive sector 325A or 325B for incoming transmissions at the same time that a signal arrives from transmitter 310 with high levels of energy, receiver 320 will receive the signal with a high level of power, enabling receiver 320 to successfully extract the data from the signal.

During beamforming training, transmitter 310 and receiver 320 each cycle through the different sectors to determine the best configuration for transmitting data from transmitter 310 to receiver 320. If one or both of transmitter 310 and receiver 320 are mobile, then the best sectors for transmitting data can change over time. Accordingly, transmitter 310 and receiver 320 can repeat the beamforming training procedure at periodic intervals to determine if an alternate configuration would result in a better connection.

In one embodiment, transmitter 310 and/or receiver 320 can operate in multiple different modes to obtain and utilize beamforming training information. In one embodiment, transmitter 310 and/or receiver 320 operate in a first mode to generate a map of the environment by scanning the environment with millimeter-wave RF signals. In one embodiment, when operating in the first mode (i.e., mapping mode), transmitter 310 is configured to transmit RF signals scanned across the environment, receive reflections of the RF signals, and then generate reflection data based on the reflected RF signals. Transmitter 310 is configured to process the reflection data and generate a map and/or imaging data of the environment based on the transmitted RF signals and the reflection data.

Then, transmitter 310 and receiver 320 utilize information from the map to determine which beams to utilize in a second mode when communicating over a wireless link. In one embodiment, transmitter 310 and receiver 320 utilize information from the map to perform an enhanced beamforming training procedure which takes into account obstacles detected in the environment. For example, if an obstacle is detected that would interfere with one or more sectors and/or beams, then these one or more sectors and/or beams can be omitted from the beamforming training procedure. In some cases, a beamforming training procedure can be skipped if information about optimal beams is obtained during the mapping mode.

Figure 4:
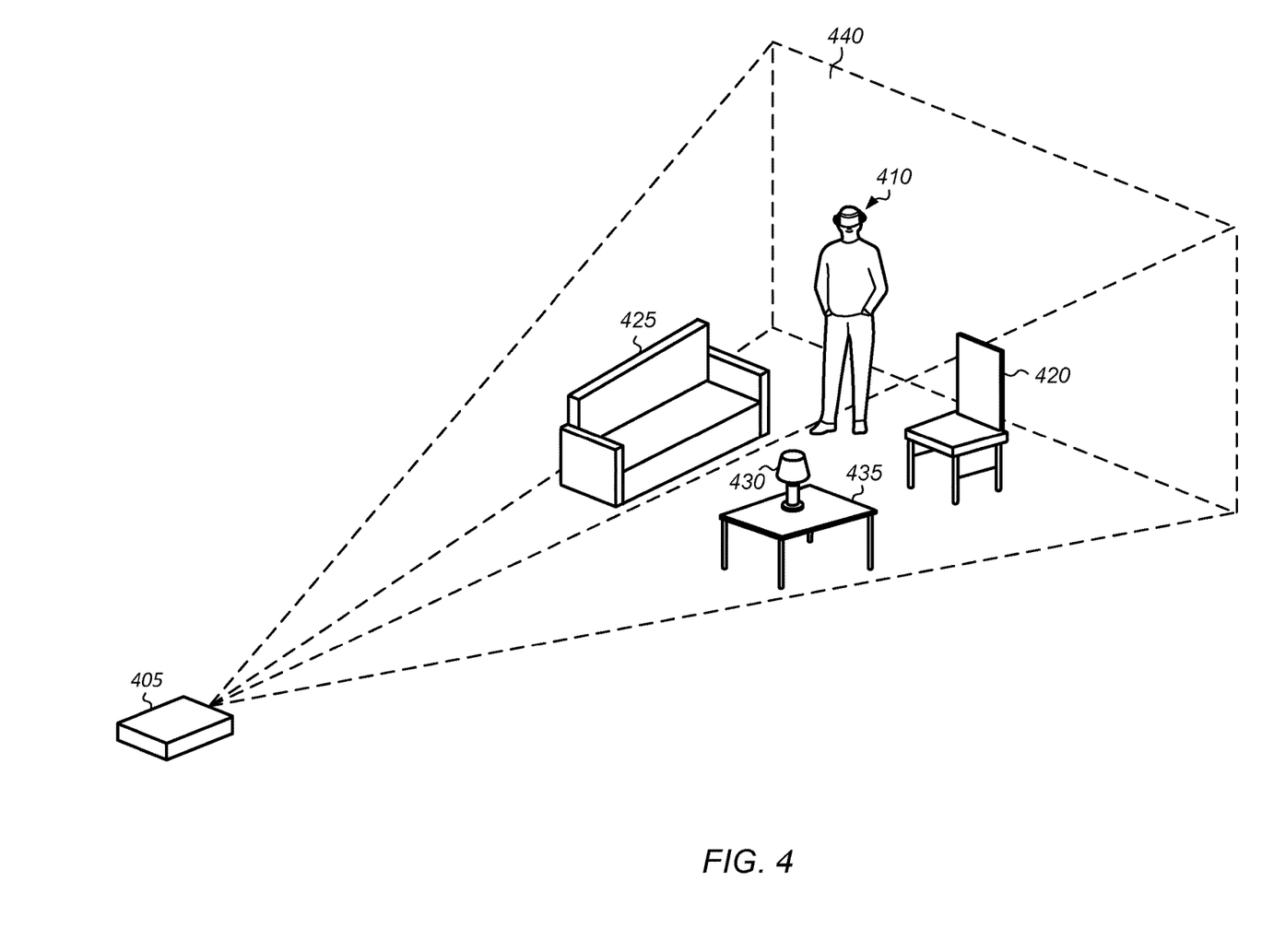
FIG. 4 is a diagram of one embodiment of mapping a VR environment.

Turning now to FIG. 4, one embodiment of mapping a VR environment is shown. In one embodiment, dual-purpose transmitter 405 is configured to map the VR room environment in a first mode and transmit video data wirelessly to HMD 410 in a second mode. In one embodiment, dual-purpose transmitter 405 includes a mm-wave RF transceiver module (e.g., mm-wave RF transceiver module 125 of FIG. 1) and antenna array for scanning the environment in the first mode. Dual-purpose transmitter 405 also utilizes the mm-wave RF transceiver module and antenna array to transmit video data wirelessly to HMD 410 in the second mode.

As shown in FIG. 4, various objects are detected in the environment, such as chair 420, sofa 425, table 435, and wall 440. Additionally, various virtual objects can be generated and included within video data generated for HMD 410, such as virtual lamp 430 on table 435. In other embodiments, other virtual objects can be generated, such as a person sitting on chair 420, a window on wall 440, artwork on wall 440, and/or other virtual objects.

Dual-purpose transmitter 405 includes circuitry for processing baseband data, converting baseband data into RF signals, controlling an antenna array, and/or performing other functions. Dual-purpose transmitter 405 is representative of any type of transmitter such as a standalone transmitter, a transmitter incorporated into another computing device, and/or a transmitter coupled to another computer device. For example, in one embodiment, dual-purpose transmitter 405 is coupled to a graphics card of a desktop computer. In this embodiment, while operating in the first mode, dual-purpose transmitter 405 generates a map of the environment and then provides the map to the graphics card. The graphics card utilizes the map to render video data for a VR or AR application. Then, the graphics card conveys the rendered video data to dual-purpose transmitter 405. Next, dual-purpose transmitter 405 receives video data from the graphics card and then sends the video data to HMD 410. HMD 410 is representative of any type of device which is configured to receive video data and drive or project video data onto a display. HMD 410 can include and/or be coupled to any type of display (e.g., glasses, smartphone display, monitor, television, goggles, retinal projector).

In various embodiments, dual-purpose transmitter is configured to operate in at least two different modes. In a first mode, transmitter 405 uses a mm-wave RF transceiver module to map the environment containing transmitter 405 and HMD 410. While operating in the first mode, transmitter 405 is configured to vary the phases of the signals generated for its antenna array such that the effective radiation pattern of the antenna array is focused in a specific direction. Transmitter 405 varies the phases of the signals such that the focused beam scans through a field of view spanning the environment. In a second mode, transmitter 405 uses the mm-wave RF transceiver module to send encoded video data to receiver 410. The video data can then be decoded and used to generate video frames for display on HMD 410. Transmitter 405 can also operate in additional modes (e.g., beamforming training mode).

In one embodiment, when operating in the first mode, transmitter 405 is configured to analyze scattered RF signals received by its antenna array to generate mapping and imaging data (e.g., two-dimensional imaging data, three-dimensional imaging data) based on timing, angle, position, signal strength, noise, attenuation, and/or other received signal attributes. Transmitter 405 is configured to generate one or more maps and/or images of the environment based on scattered RF signals which are received and processed. In one embodiment, transmitter 405 is configured to generate a series of RF pulse signals of millimeter wavelength. The RF pulse signals can reflect and scatter off of objects, and then the reflections return back to the antenna array of transmitter 405. The received reflection signals can be sampled and converted into digital samples by an analog to digital converter and then provided to one or more processing units of transmitter 405. The processing unit(s) of transmitter 405 are configured to generate a map and/or image based on the RF energy that is reflected back from the generated pulse signals.

In one embodiment, dual-purpose transmitter 405 (or a graphics card or other processing device) utilizes the information obtained during the first mode to modify the video frames that are being rendered. These rendered video frames are then sent by transmitter 405 to HMD 410 when transmitter 405 is operating in the second mode. For example, dual-purpose transmitter 405 can detect one or more objects during the scan of the room environment, and then transmitter 405 can add these one or more objects to the VR environment being rendered. These objects will then appear in the video data which is sent from dual-purpose transmitter 405 to HMD 410.

In one embodiment, dual-purpose transmitter 405 utilizes the information obtained during the first mode to adjust how the video data is transmitted to HMD 410 during the second mode. For example, dual-purpose transmitter 405 can detect obstacles between transmitter 405 and HMD 410 while mapping the room environment during the first mode. Then, transmitter 405 can change the antenna sectors and/or beams which are utilized for transmitting video data based on these detected obstacles.

In other embodiments, dual-purpose transmitter 405 and HMD 410 can be located in other types of environments besides a room or the interior of a building. For example, the user wearing HMD 410 can be outside of a building, in a stadium, in a park, in a waterpark, or other location. One or more transmitters can be located in the vicinity of the user wearing HMD 410. The one or more transmitters can be located at fixed locations or on mobile platforms. For example, in one embodiment, transmitter 405 can be incorporated within a drone, a land vehicle, or other moving platform. Transmitter 405 can then repeatedly scan and map the environment of the user as the scenery of the environment changes based on user movement and/or transmitter movement.

Figure 5:
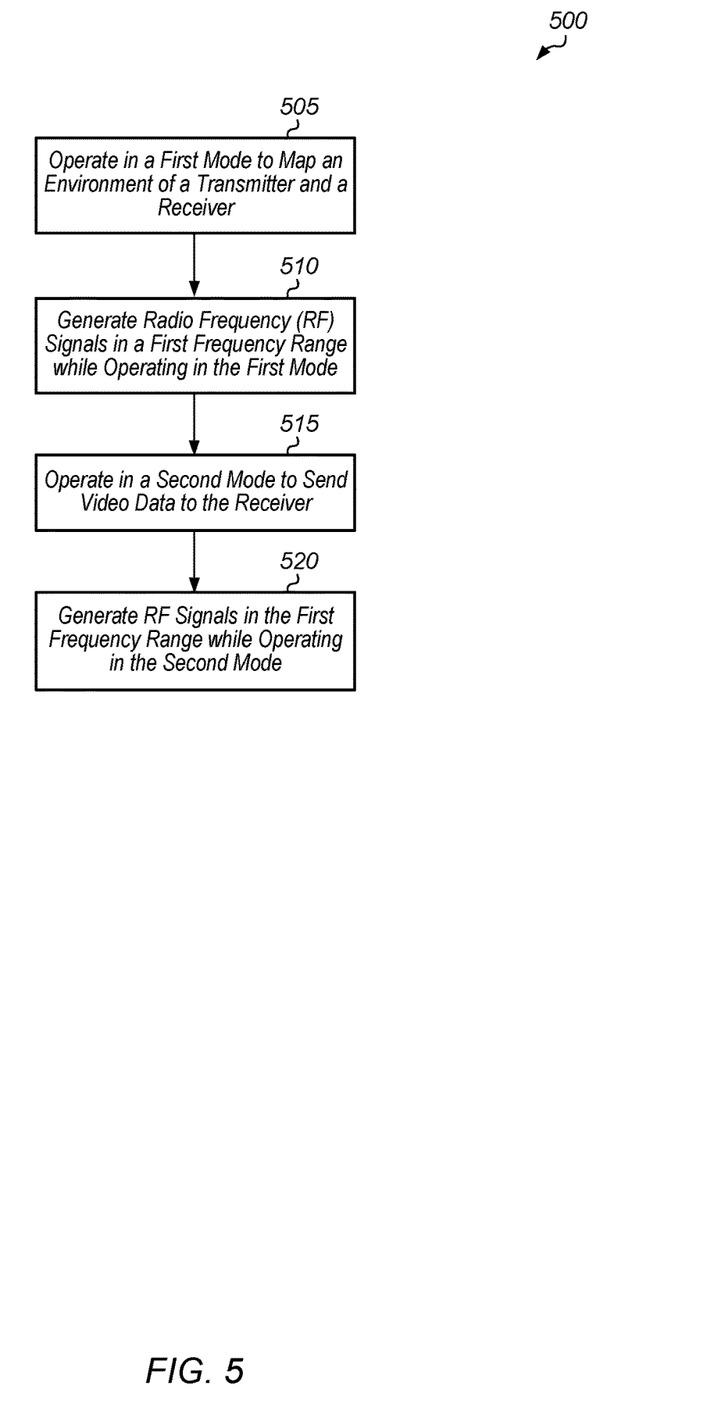
FIG. 5 is a generalized flow diagram illustrating one embodiment of a method for implementing a dual-mode wireless transmitter.
Figure 6:
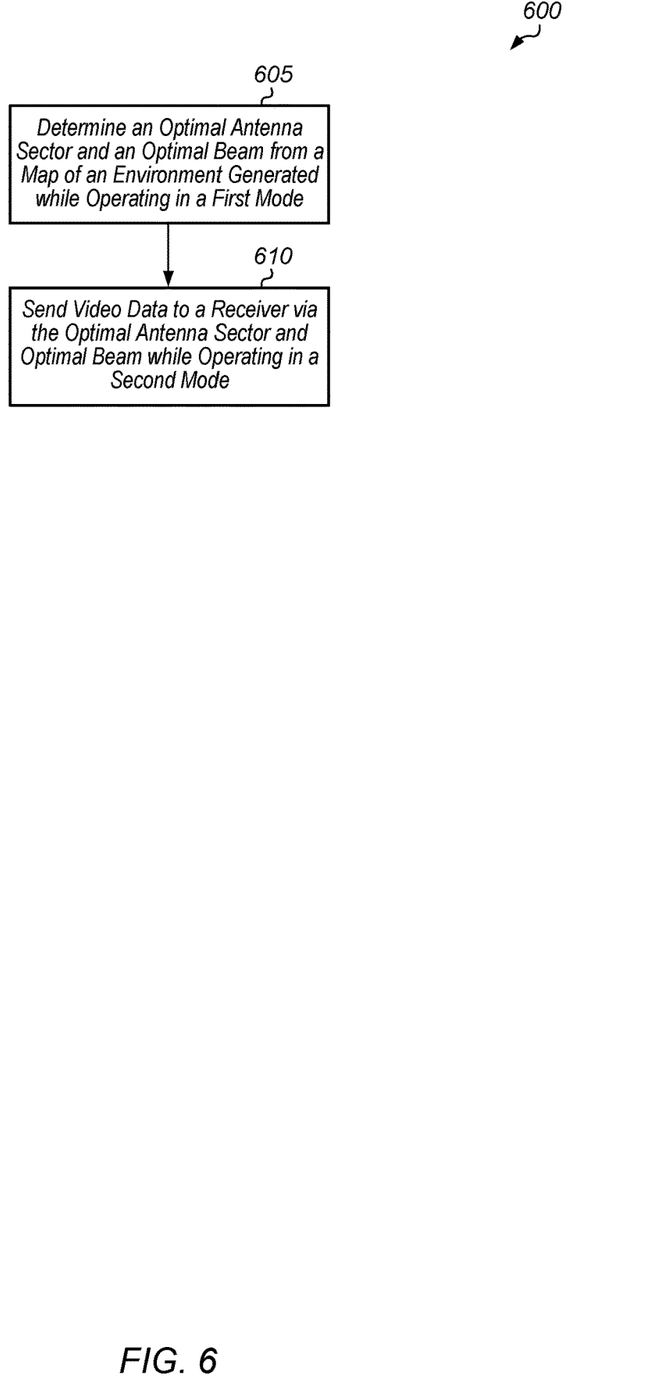
FIG. 6 is a generalized flow diagram illustrating another embodiment of a method for implementing a dual-mode wireless transmitter.
Figure 7:
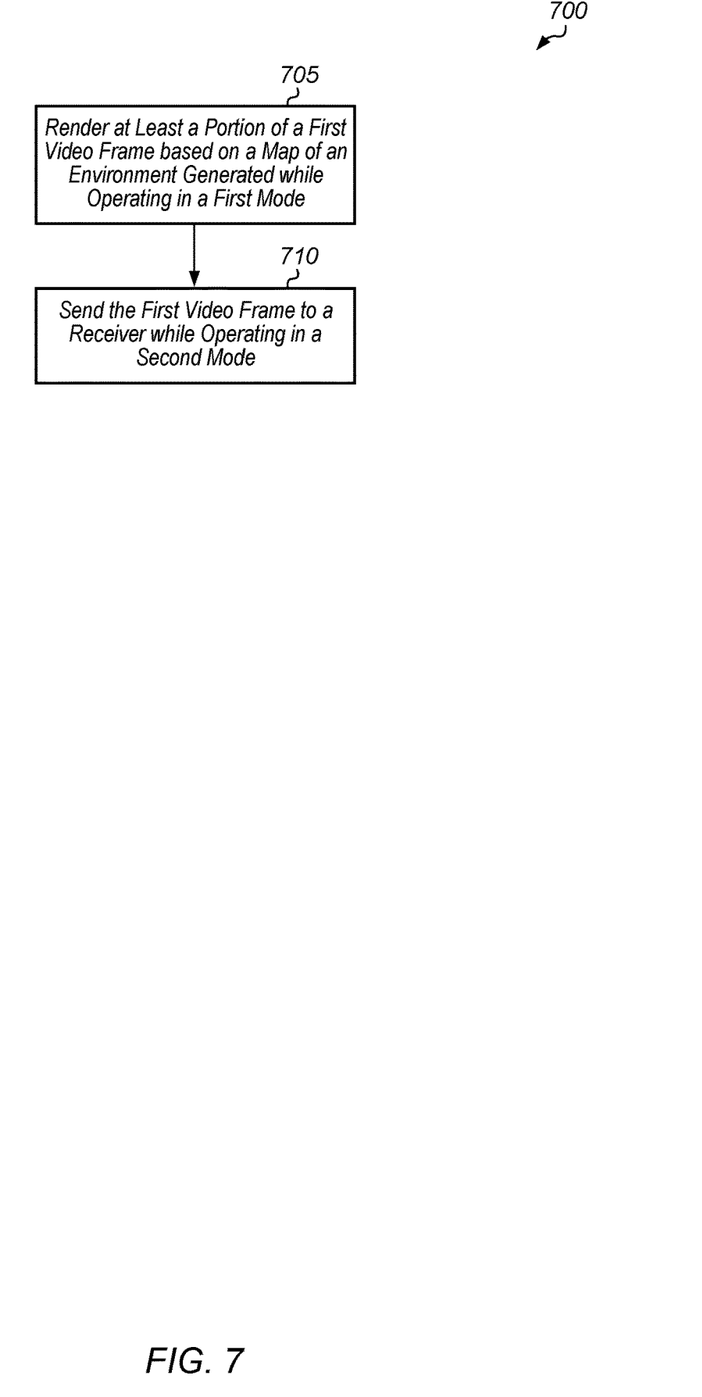
FIG. 7 is a generalized flow diagram illustrating another embodiment of a method for implementing a dual-mode wireless transmitter.
Figure 8:
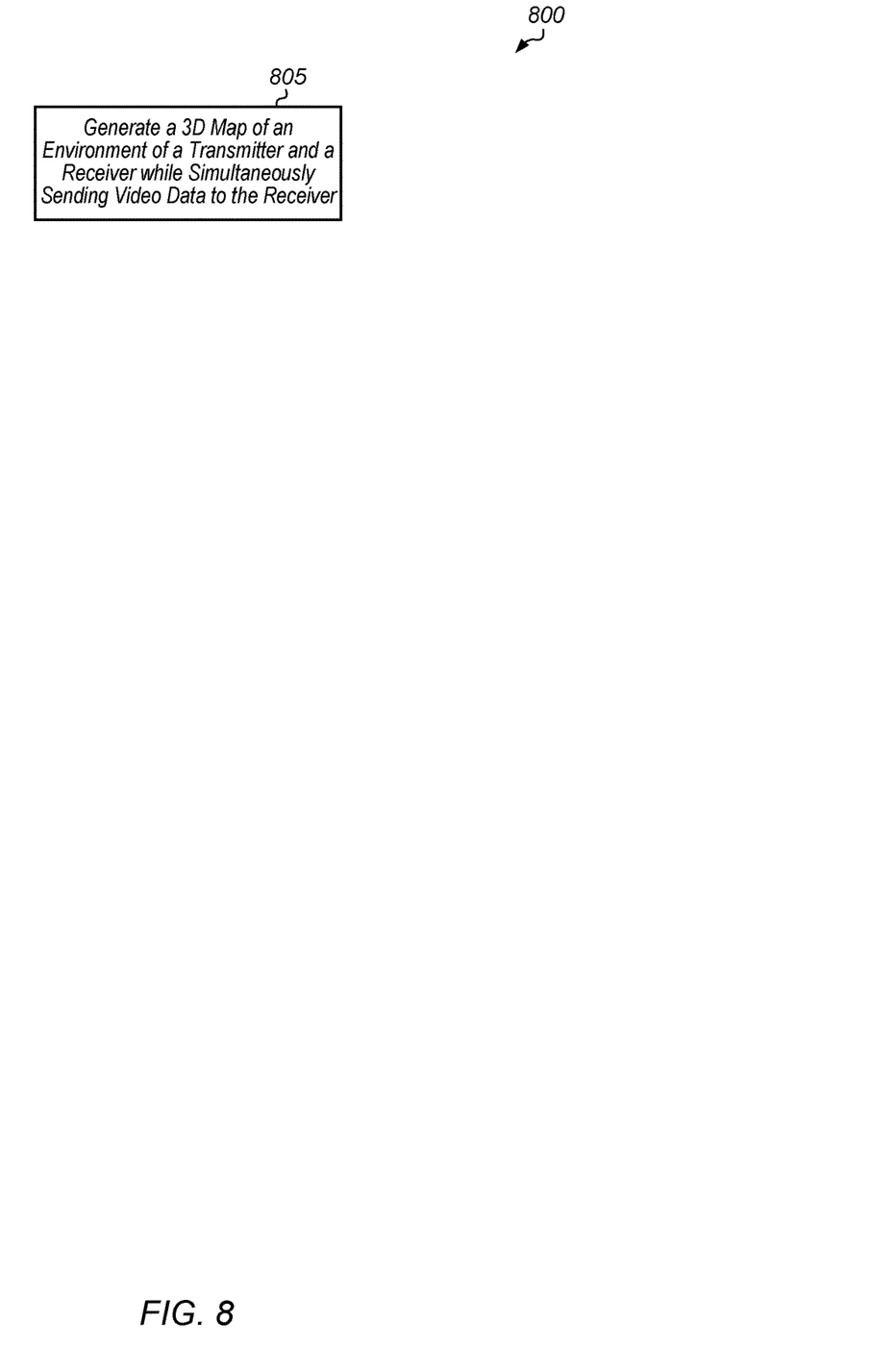
FIG. 8 is a generalized flow diagram illustrating one embodiment of a method for operating a millimeter-wave transmitter.

Turning now to FIG. 5, one embodiment of a method 500 for implementing a dual-mode transmitter is shown. For purposes of discussion, the steps in this embodiment and those of FIG. 6-8 are shown in sequential order. However, it is noted that in various embodiments of the described methods, one or more of the elements described are performed concurrently, in a different order than shown, or are omitted entirely. Other additional elements are also performed as desired. Any of the various systems or apparatuses described herein are configured to implement method 500.

A transmitter operates in a first mode to map an environment of the transmitter and a receiver (block 505). The transmitter and receiver can be any type of computing devices, with the type of computing devices varying according to the embodiment. The transmitter generates radio frequency (RF) signals in a first frequency range while operating in the first mode (block 510). In one embodiment, the first frequency range is in the 60 GHz frequency band and the RF signals have millimeter wavelengths. In one embodiment, the transmitter is configured to emit RF signals in a scanning pattern to map the environment of the transmitter and the receiver. In one embodiment, the transmitter includes a phase array antenna with multiple antenna elements. The transmitter is configured to vary the phases of the signals generated for the antennas such that the effective radiation pattern of the antenna array is focused in a specific direction. To perform a scan of the environment, the transmitter varies the phases of the signals such that the focused beam scans through a field of view spanning the environment.

The RF signals reflect and scatter off of objects, and then the reflections return back to the antenna of the transmitter where they are sampled and converted into digital samples by an analog to digital converter and then provided to a processing unit. The processing unit is configured to analyze the samples of the scattered RF signals to generate mapping and imaging data (e.g., two-dimensional imaging data, three-dimensional imaging data) based on timing, angle, position, signal strength, noise, attenuation, and/or other received signal attributes. In other embodiments, other techniques for mapping the environment can be utilized.

At a later point in time, the transmitter operates in a second mode to send video data to the receiver (block 515). The video data which is sent from the transmitter to the receiver can be rendered based on the previously generated map of the environment. In one embodiment, the transmitter and the receiver are part of an augmented reality (AR) system. In another embodiment, the transmitter and the receiver are part of a virtual reality (VR) system. In other embodiments, the transmitter and the receiver are part of other types of systems. The transmitter generates RF signals in the first frequency range while operating in the second mode (block 520). After block 520, method 500 ends. Alternatively, after block 520, method 500 can return to block 505 with the transmitter switching back to the first mode.

Referring now to FIG. 6, another embodiment of a method 600 for implementing a dual-mode transmitter is shown. A transmitter determines an optimal antenna sector and an optimal beam from a map of an environment generated while operating in a first mode (block 605). Next, the transmitter sends video data to a receiver via the optimal antenna sector and optimal beam while operating in a second mode (block 610). In another embodiment, the transmitter utilizes the map of the environment to modify how a subsequent beamforming training session is implemented. For example, the map of the environment can allow the transmitter to check only a subset of the total number of sectors during the beamforming training session by eliminating any sectors which would be obstructed by object(s) detected in the map. After block 610, method 600 ends. It is noted that method 600 can be performed periodically to update the optimal antenna sector and the optimal beam from maps of the environment generated while operating in the first mode.

Turning now to FIG. 7, another embodiment of a method 700 for implementing a dual-mode transmitter is shown. A transmitter renders at least a portion of a first video frame based on a map of an environment generated while operating in a first mode (block 705). When operating in the first mode, transmitter is configured to utilize radio frequency (RF) signals to detect the presence of objects in the environment. For example, the position, orientation, and motion of objects can be determined. The transmitter is configured to generate RF signals, and then reflected portions of the signals are received and analyzed to determine the topology of the environment being scanned.

For example, an object in the scanned environment can reflect, refract, absorb, and/or scatter the emitted electromagnetic signals. A return signal including a reflected, refracted, absorbed, and/or scattered signal can be received by the antenna of the transmitter. A distance to the object can be determined by a delay of when the reflected signal was received compared to when the transmitted signal was sent. The transmitter is configured to analyze and process the received reflections to extrapolate a map of the environment based on the received reflections. The map of the environment is then utilized to render at least a portion of the first video frame. Next, the transmitter sends the first video frame to a receiver while operating in a second mode (block 710). After block 710, method 700 ends. It is noted that method 700 can be repeated for subsequent video frames that are rendered and sent to the receiver.

Turning now to FIG. 8, one embodiment of a method 800 for operating a millimeter-wave transmitter is shown. The transmitter generates a three-dimensional (3D) map of an environment of the transmitter and a receiver while simultaneously sending video data to the receiver (block 805). For example, the transmitter maps the environment by receiving reflections from the transmitted electromagnetic waves which carry the video data to the receiver. The transmitter analyzes the reflections to determine the angle of arrival and distance of the objects which caused the reflections. Then, the transmitter generates a map of the environment based on the objects detected within the environment. After block 805, method 800 ends.

In various embodiments, program instructions of a software application are used to implement the methods and/or mechanisms described herein. For example, program instructions executable by a general or special purpose processor are contemplated. In various embodiments, such program instructions can be represented by a high level programming language. In other embodiments, the program instructions can be compiled from a high level programming language to a binary, intermediate, or other form. Alternatively, program instructions can be written that describe the behavior or design of hardware. Such program instructions can be represented by a high-level programming language, such as C. Alternatively, a hardware design language (HDL) such as Verilog can be used. In various embodiments, the program instructions are stored on any of a variety of non-transitory computer readable storage mediums. The storage medium is accessible by a computing system during use to provide the program instructions to the computing system for program execution. Generally speaking, such a computing system includes at least one or more memories and one or more processors configured to execute program instructions.

It should be emphasized that the above-described embodiments are only non-limiting examples of implementations. Numerous variations and modifications will become apparent to those skilled in the art once the above disclosure is fully appreciated. It is intended that the following claims be interpreted to embrace all such variations and modifications.

What is claimed is:

1. A system comprising:
a transmitter comprising circuitry configured to:
generate a map of an environment of the transmitter, based at least in part on reflections of radio frequency (RF) signals; and
send video data to a receiver via an antenna sector that the map indicates does not include an obstacle.

2. The system as recited in claim 1, wherein the transmitter is configured to:
   transmit radio frequency (RF) signals scanned across the environment;
   receive reflections of the RF signals;
   generate reflection data based on the reflected RF signals; and
   process the reflection data to generate the map of the environment.

3. The system as recited in claim 1, wherein the transmitter is further configured to:
   perform a beamforming procedure that omits a sector, responsive to the map indicating the sector includes an obstacle.

4. The system as recited in claim 1, wherein the system is further configured to:
   render at least a portion of a first video frame based on the map of the environment; and
   send the first video frame to the receiver.

5. The system as recited in claim 4, wherein the system is further configured to:
   detect one or more objects in the map of the environment; and
   render the one or more objects in the first video frame.

6. The system as recited in claim 1, wherein the transmitter is configured to radio frequency (RF) signals in a first frequency range corresponding to frequencies with wavelengths between 1 and 10 millimeters.

7. A method comprising:
   generating, by circuitry of a transmitter, a map of an environment of the transmitter, based at least in part on reflections of radio frequency (RF) signals; and
   sending, by the transmitter, video data to a receiver via an antenna sector that the map indicates does not include an obstacle.

8. The method as recited in claim 7, further comprising:
   transmitting radio frequency (RF) signals scanned across the environment;
   receiving reflections of the RF signals;
   generating reflection data based on the reflected RF signals; and
   processing the reflection data to generate the map of the environment.

9. The method as recited in claim 7, further comprising refining a beamforming procedure by skipping at least one sector that the map indicates includes an obstacle.

10. The method as recited in claim 7, further comprising:
    rendering at least a portion of a first video frame based on the map of the environment; and
    sending the first video frame to the receiver.

11. The method as recited in claim 10, further comprising:
    detecting one or more objects in the map of the environment; and
    rendering the one or more objects in the first video frame.

12. The method as recited in claim 7, further comprising transmitting radio frequency (RF) signals in a first frequency range corresponding to frequencies with wavelengths between 1 and 10 millimeters.

13. An apparatus comprising:
    a processor;
    a memory; and
    a radio frequency (RF) transceiver module; and
    wherein the apparatus comprises circuitry i-s configured to:
      generate a map of an environment, based at least in part on reflections of radio frequency (RF) signals; and
      send video data to a receiver via an antenna sector that the map indicates does not include an obstacle.

14. The apparatus as recited in claim 13, wherein the apparatus is configured to:
    transmit radio frequency (RF) signals scanned across the environment;
    receive reflections of the RF signals;
    generate reflection data based on the reflected RF signals; and
    process the reflection data to generate the map of the environment.

15. The apparatus as recited in claim 13, wherein the RF signals have wavelengths between 1 and 10 millimeters.

16. The apparatus as recited in claim 13, wherein the apparatus is configured to:
    render at least a portion of a first video frame based on the map of the environment; and
    send the first video frame to the receiver.

17. The apparatus as recited in claim 16, wherein the apparatus is further configured to:
    detect one or more objects in the map of the environment; and
    render the one or more objects in the first video frame.

* * * * *

UNITED STATES PATENT AND TRADEMARK OFFICE
CERTIFICATE OF CORRECTION

PATENT NO. : 12,044,774 B2
APPLICATION NO. : 18/048689
DATED : July 23, 2024
INVENTOR(S) : Vu et al.

Page 1 of 1

It is certified that error appears in the above-identified patent and that said Letters Patent is hereby corrected as shown below:

In the Claims

Column 14, Claim 13, Line 17, please delete "comprises circuitry i-s configured" and insert -- comprises circuitry configured --.

Signed and Sealed this
Seventh Day of January, 2025

Derrick Brent
*Acting Director of the United States Patent and Trademark Office*